United States Patent
Akaba et al.

(10) Patent No.: US 10,683,014 B2
(45) Date of Patent: Jun. 16, 2020

(54) VEHICLE CONTROL SYSTEM, VEHICLE CONTROL METHOD, AND VEHICLE CONTROL PROGRAM

(71) Applicant: HONDA MOTOR CO., LTD., Minato-ku, Tokyo (JP)

(72) Inventors: Hiroshi Akaba, Wako (JP); Osamu Ito, Wako (JP); Masakuni Murakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 193 days.

(21) Appl. No.: 15/916,462

(22) Filed: Mar. 9, 2018

(65) Prior Publication Data

US 2018/0281819 A1 Oct. 4, 2018

(30) Foreign Application Priority Data

Mar. 31, 2017 (JP) .................. 2017-071333

(51) Int. Cl.
*B60W 50/10* (2012.01)
*B60W 10/04* (2006.01)
(Continued)

(52) U.S. Cl.
CPC ............ *B60W 50/10* (2013.01); *B60W 10/04* (2013.01); *B60W 10/184* (2013.01); *B60W 10/20* (2013.01); *B60W 50/082* (2013.01); *G05D 1/0088* (2013.01); *G05D 1/0223* (2013.01); *G06F 3/017* (2013.01); *G06F 3/0304* (2013.01); *G06F 3/167* (2013.01);
(Continued)

(58) Field of Classification Search
CPC .... B60W 50/10; B60W 10/04; B60W 10/184; B60W 10/20; B60W 50/082; G05D 1/0223; G06F 3/017; G06F 3/0304; G06F 3/167
USPC .......................................................... 701/23
See application file for complete search history.

(56) References Cited

U.S. PATENT DOCUMENTS

2014/0244096 A1* 8/2014 An ................ G05D 1/0055
701/25
2016/0207536 A1* 7/2016 Yamaoka ............ B60W 30/182
(Continued)

FOREIGN PATENT DOCUMENTS

JP 2003-186492 7/2003

*Primary Examiner* — Yazan A Soofi
(74) *Attorney, Agent, or Firm* — Amin, Turocy & Watson, LLP

(57) ABSTRACT

A vehicle control system includes: an automated driving control part that performs automated driving in which at least one of acceleration/deceleration and steering of a vehicle is automatically controlled; a driving operation element that receives an operation of an occupant with respect to acceleration/deceleration and steering of the vehicle; an operation element state change part that makes the driving operation element disabled when the automated driving by the automated driving control part is performed; and an alternative operation reception part that receives an operation which is different from the operation with respect to the driving operation element by the occupant when the driving operation element is disabled by the operation element state change part, wherein the automated driving control part controls at least one of acceleration/deceleration and steering of the vehicle based on the operation by the alternative operation reception part.

11 Claims, 14 Drawing Sheets

(51) Int. Cl.
  *B60W 10/184* (2012.01)
  *B60W 10/20* (2006.01)
  *B60W 50/08* (2020.01)
  *G05D 1/00* (2006.01)
  *G05D 1/02* (2020.01)
  *G06F 3/01* (2006.01)
  *G06F 3/03* (2006.01)
  *G06F 3/16* (2006.01)

(52) U.S. Cl.
  CPC ..... *B60W 2420/42* (2013.01); *B60W 2420/54* (2013.01); *B60W 2540/00* (2013.01); *B60W 2540/21* (2020.02); *B60W 2540/215* (2020.02); *G05D 2201/0213* (2013.01); *G06F 2203/0381* (2013.01)

(56) References Cited

U.S. PATENT DOCUMENTS

| | | | |
|---|---|---|---|
| 2017/0203763 A1* | 7/2017 | Yamada | G01K 7/16 |
| 2017/0282717 A1* | 10/2017 | Jang | B60W 10/20 |
| 2017/0364066 A1* | 12/2017 | Yamada | G05D 1/0016 |
| 2018/0348759 A1* | 12/2018 | Freeman | G05D 1/0061 |
| 2019/0064805 A1* | 2/2019 | Frazzoli | G05D 1/0061 |

\* cited by examiner

| MOTION OF OCCUPANT | SPEECH OF OCCUPANT | COMMAND CONTENT |
|---|---|---|
| MOVE HAND TO RIGHT SIDE MOVEMENT SPEED IS THRESHOLD VALUE Vth OR MORE, MOVEMENT DISTANCE IS D1 OR MORE AND LESS THAN D2 | "APPROACH TO RIGHT SIDE" SOUND VOLUME IS THRESHOLD VALUE Oth OR MORE | APPROACH TO RIGHT SIDE OF TRAVEL LANE AND TRAVEL |
| MOVE HAND TO RIGHT SIDE MOVEMENT SPEED IS THRESHOLD VALUE Vth OR MORE, MOVEMENT DISTANCE IS D2 OR MORE | "CHANGE LANE TO RIGHT LANE" SOUND VOLUME IS THRESHOLD VALUE Oth OR MORE | CHANGE LANE TO RIGHT LANE OF TRAVEL LANE |
| MOVE HAND TO LEFT SIDE MOVEMENT SPEED IS THRESHOLD VALUE Vth OR MORE, MOVEMENT DISTANCE IS D1 OR MORE AND LESS THAN D2 | "APPROACH TO LEFT SIDE" SOUND VOLUME IS THRESHOLD VALUE Oth OR MORE | APPROACH TO LEFT SIDE OF TRAVEL LANE AND TRAVEL |
| MOVE HAND TO LEFT SIDE MOVEMENT SPEED IS THRESHOLD VALUE Vth OR MORE, MOVEMENT DISTANCE IS D2 OR MORE | "CHANGE LANE TO LEFT LANE" SOUND VOLUME IS THRESHOLD VALUE Oth OR MORE | CHANGE LANE TO LEFT LANE OF TRAVEL LANE |
| FISTS OF BOTH HANDS ARE DIRECTED TO VEHICLE ROOM INSIDE CAMERA | "STOP" SOUND VOLUME IS THRESHOLD VALUE Oth OR MORE | STOP VEHICLE |
| · | · | · |

VEHICLE CONTROL SYSTEM, VEHICLE CONTROL METHOD, AND VEHICLE CONTROL PROGRAM

CROSS-REFERENCE TO RELATED APPLICATION

Priority is claimed on Japanese Patent Application No. 2017-071333, filed on Mar. 31, 2017, the contents of which are incorporated herein by reference.

BACKGROUND

Field of the Invention

The present invention relates to a vehicle control system, a vehicle control method, and a vehicle control program.

Background

In the related art, a technique that estimates a command which is intended by an occupant on the basis of a speech input and an operation input from the occupant and road information and that performs a vehicle control on the basis of the estimated result is disclosed (for example, refer to Japanese Patent Application, Publication No. 2003-186492A).

SUMMARY

However, in the related art, a reception method of an operation in accordance with the state of a vehicle during automated driving is not considered.

An object of an aspect of the present invention is to provide a vehicle control system, a vehicle control method, and a vehicle control program capable of realizing a reception method of an operation in accordance with the situation of a vehicle during automated driving.

(1) A vehicle control system according to an aspect of the present invention includes: an automated driving control part that performs automated driving in which at least one of acceleration/deceleration and steering of a vehicle is automatically controlled; a driving operation element that receives an operation of an occupant with respect to acceleration/deceleration and steering of the vehicle; an operation element state change part that makes the driving operation element disabled when the automated driving by the automated driving control part is performed; and an alternative operation reception part that receives an operation which is different from the operation with respect to the driving operation element by the occupant when the driving operation element is disabled by the operation element state change part, wherein the automated driving control part controls at least one of acceleration/deceleration and steering of the vehicle based on the operation by the alternative operation reception part.

(2) In the above vehicle control system, the alternative operation reception part may include a gesture recognition unit that recognizes a motion of the occupant as a gesture, and an operation by the motion of the occupant that is recognized by the gesture recognition unit may be received.

(3) In the above vehicle control system, the automated driving control part may change a course of the vehicle based on a motion of a predetermined region of a body of the occupant that is recognized by the alternative operation reception part.

(4) In the above vehicle control system, the alternative operation reception part may further include a speech recognition unit that recognizes speech from the occupant, and an operation by a content of the speech that is recognized by the speech recognition unit may be received.

(5) In the above vehicle control system, the alternative operation reception part may receive the operation by the content of the speech when a sound volume of the speech that is acquired by the speech recognition unit is equal to or more that a threshold value.

(6) In the above vehicle control system, the alternative operation reception part may further include a switch unit, and during an operation is being applied on the switch unit or before a predetermined period of time elapses since an operation is applied on the switch unit, the operation which is different from the operation with respect to the driving operation element by the occupant may be received.

(7) In the above vehicle control system, the alternative operation reception part may further include a tread detection sensor that detects a pressure with respect to a floor surface of the vehicle, and the automated driving control part may perform a control with respect to acceleration/deceleration of the vehicle when the driving operation element is disabled by the operation element state change part and when a pressure is detected by the tread detection sensor.

(8) The above vehicle control system may further include a circumstance situation recognition unit that recognizes a circumstance situation of the vehicle and that performs a risk determination of a collision with respect to an object outside the vehicle, wherein the automated driving control part may make a degree of the risk determination by the circumstance situation recognition unit when the driving operation element is disabled by the operation element state change part higher compared to a degree of a risk determination when the driving operation element is operable.

(9) Another aspect of the present invention is a vehicle control method, by way of an in-vehicle computer, that includes: performing automated driving in which at least one of acceleration/deceleration and steering of a vehicle is automatically controlled; making a driving operation element that receives an operation of an occupant with respect to acceleration/deceleration and steering of the vehicle disabled when the automated driving is performed; receiving an operation which is different from the operation with respect to the driving operation element by the occupant when the driving operation element is disabled; and controlling at least one of acceleration/deceleration and steering of the vehicle based on the received operation which is different from the operation with respect to the driving operation element.

(10) Still another aspect of the present invention is a non-transitory computer-readable recording medium including a vehicle control program that causes an in-vehicle computer to: perform automated driving in which at least one of acceleration/deceleration and steering of a vehicle is automatically controlled; make a driving operation element that receives an operation of an occupant with respect to acceleration/deceleration and steering of the vehicle disabled when the automated driving is performed; receive an operation which is different from the operation with respect to the driving operation element by the occupant when the driving operation element is disabled; and control at least one of acceleration/deceleration and steering of the vehicle based on the received operation which is different from the operation with respect to the driving operation element.

According to the configurations (1), (9), and (10) described above, it is possible to realize a reception method of an operation in accordance with the situation of a vehicle during automated driving.

According to the configurations (2) and (3) described above, it is possible to receive the operation of the occupant by recognizing the motion of the occupant according to the analysis of a captured image even when the driving operation element is disabled.

According to the configurations (4) and (5) described above, it is possible to receive the operation of the occupant by recognizing the speech content of the occupant according to the analysis of speech even when the driving operation element is disabled.

According to the configuration (6) described above, it is possible to prevent an erroneous determination of a command of the occupant by receiving an operation which is different from the operation with respect to the driving operation element by the occupant when there is an operation with respect to the switch unit.

According to the configuration (7) described above, it is possible to receive the operation of the occupant on the basis of the detection result of the tread detection sensor even when the driving operation element is disabled.

According to the configuration (8) described above, it is possible to perform a safer vehicle control by making the degree of the risk determination of the collision high when the driving operation element is disabled.

BRIEF DESCRIPTION OF THE DRAWINGS

FIG. 5 is a view showing the content of a command determination table.

DESCRIPTION OF THE EMBODIMENTS

Hereinafter, embodiments of a vehicle control system, a vehicle control method, and a vehicle control program of the present invention will be described with reference to the drawings. In the embodiments, the vehicle control system is applied to an automated driving vehicle.

First Embodiment

[Entire Configuration]

Figure 1:
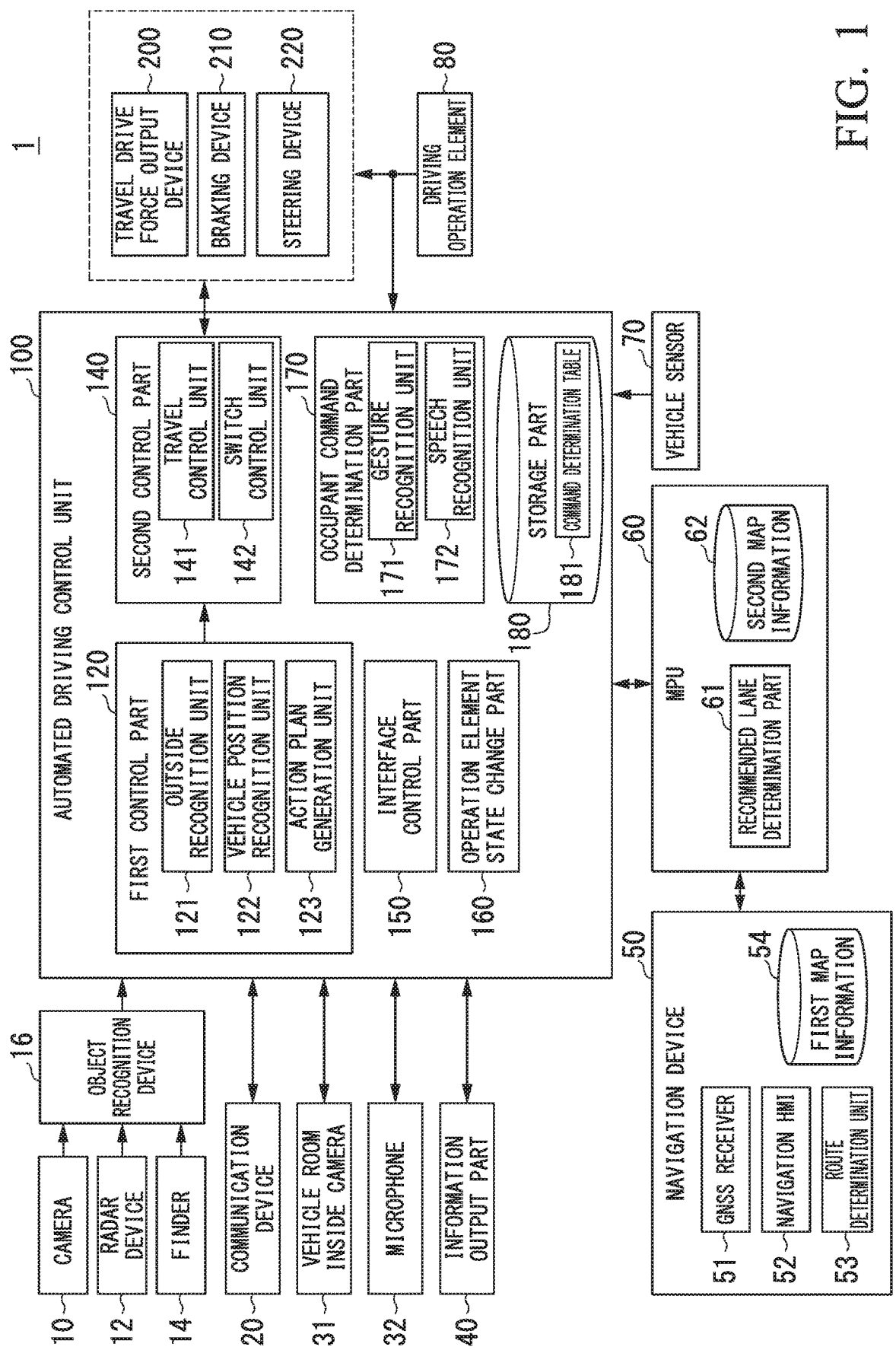
FIG. 1 is a configuration view of a vehicle control system of a first embodiment.

FIG. 1 is a configuration view of a vehicle control system 1 of a first embodiment. A vehicle (hereinafter, referred to as a vehicle M) on which the vehicle control system 1 is mounted is, for example, a vehicle having two wheels, three wheels, four wheels, or the like. A drive source of the vehicle on which the vehicle control system 1 is mounted is an internal combustion engine such as a diesel engine or a gasoline engine, an electric motor, or the combination of the internal combustion engine and the electric motor. The electric motor is operated by using generated electric power by a generator that is connected to the internal combustion engine or discharged electric power of a secondary battery or a fuel cell.

The vehicle control system 1 includes, for example, a camera 10, a radar device 12, a finder 14, an object recognition device 16, a communication device 20, a vehicle room inside camera 31, a microphone 32, an information output part 40, a navigation device 50, a MPU (Micro-Processing Unit) 60, a vehicle sensor 70, a driving operation element 80, an automated driving control unit 100, a travel drive force output device 200, a braking device 210, and a steering device 220. The devices and equipment are mutually connected by a multiplex communication line such as a CAN (Controller Area Network) communication line, a serial communication line, a wireless communication network, and the like. The configuration shown in FIG. 1 is merely an example; part of the configuration may be omitted, and another configuration may be further added. A combination of an occupant command determination part 170 and part of the vehicle room inside camera 31, the microphone 32, a switch unit 33 described below, and a tread detection sensor 34 described below is an example of an "alternative operation reception part". The vehicle room inside camera 31 is an example of an "imaging part". The microphone 32 is an example of a "speech acquisition part".

The camera 10 is, for example, a digital camera that uses a solid-state imaging element such as a CCD (Charge-Coupled Device) or a CMOS (Complementary Metal Oxide Semiconductor). One or a plurality of cameras 10 are attached to an arbitrary part of the vehicle M on which the vehicle control system 1 is mounted. When imaging the frontward direction, the camera 10 is attached to an upper part of a front window shield, a rear surface of a room mirror, and the like. When imaging the rearward direction, the camera 10 is attached to an upper part of a rear window shield, a rear door, and the like. When imaging the lateral direction, the camera 10 is attached to a door mirror and the like. The camera 10, for example, periodically and repeatedly captures an image around the vehicle M. The camera 10 may be a stereo camera.

The radar device 12 radiates radio waves such as millimeter waves to the vicinity of the vehicle M, detects the radio waves (reflected waves) that are reflected by an object, and detects at least a position (distance and azimuth) of the object. One or a plurality of radar devices 12 are attached to an arbitrary part of the vehicle M. The radar device 12 may detect the position and the speed of an object by a FMCW (Frequency Modulated Continuous Wave) method.

The finder 14 is a LIDAR (Light Detection and Ranging, or Laser Imaging Detection and Ranging) that measures scattered light with respect to irradiation light and that detects a distance to a target. One or a plurality of finders 14 are attached to an arbitrary part of the vehicle M.

The object recognition device 16 performs a sensor fusion process with respect to a detection result by part of or all of the camera 10, the radar device 12, and the finder 14 and recognizes the position, the category, the speed, and the like of the object. The object recognition device 16 outputs the recognition result to the automated driving control unit 100.

The communication device 20 communicates with another vehicle that is present around the vehicle M, for example, by using a cellular network, a Wi-Fi network, Bluetooth (registered trademark), DSRC (Dedicated Short Range Communication), and the like or communicates with a variety of server apparatuses via a wireless base station. The communication device 20 communicates with a terminal apparatus that is carried by a person outside the vehicle.

The vehicle room inside camera 31 is arranged, for example, at a position at which an upper body of an occupant who is seated on a driver's seat inside the vehicle room can be imaged. The vehicle room inside camera 31, for example, periodically and repeatedly captures an image of the occupant who is seated on the driver's seat. The captured image of the vehicle room inside camera 31 is output to the automated driving control unit 100.

The microphone 32 acquires speech information of the occupant inside the vehicle room. The speech information that is acquired from the microphone 32 is output to the automated driving control unit 100.

The information output part 40 is, for example, a variety of display devices, a speaker, a buzzer, and the like. The information output part 40 outputs a variety of information to the occupant inside the vehicle by the control of an interface control part 150.

The navigation device 50 includes, for example, a GNSS (Global Navigation Satellite System) receiver 51, a navigation HMI (Human Machine Interface) 52, and a route determination unit 53. The navigation device 50 holds first map information 54 in a storage device such as a HDD (Hard Disk Drive) and a flash memory. The GNSS receiver identifies the position of the vehicle M on the basis of a signal that is received from the GNSS satellite. The position of the vehicle M may be identified or supplemented by an INS (Inertial Navigation System) that utilizes an output of the vehicle sensor 70. The navigation HMI 52 includes a display device, a speaker, a touch panel, a key, and the like. For example, the route determination unit 53 determines, with reference to the first map information 54, a route (including, for example, information regarding a transit point when traveling to a destination) from the position (or an input arbitrary position) of the vehicle M that is identified by the GNSS receiver 51 to a destination that is input by the occupant by using the navigation HMI 52. The first map information 54 is, for example, information in which a road shape is described by a link indicating a road and a node that is connected by the link. The first map information 54 may include the curvature of a road, POI (Point Of Interest) information, and the like. The route that is determined by the route determination unit 53 is output to the MPU 60. The navigation device 50 may perform a route guide using the navigation HMI 52 on the basis of the route that is determined by the route determination unit 53. The navigation device 50 may be realized by, for example, a function of a terminal apparatus such as a smartphone or a tablet terminal that is held by the user. The navigation device 50 may transmit a current position and a destination to a navigation server via the communication device 20 and may acquire a route which is returned from the navigation server.

The MPU 60 functions, for example, as a recommended lane determination part 61. The MPU 60 holds second map information 62 in a storage device such as an HDD and a flash memory. The recommended lane determination part 61 divides the route that is supplied from the navigation device 50 into a plurality of blocks (for example, divides at an interval of 100 [m] with respect to a vehicle proceeding direction) and determines a recommended lane for each block with reference to the second map information 62. The recommended lane determination part 61 determines, for example, which lane from the left the vehicle should travel on. When a branching point, a merging point, or the like is present on the route, the recommended lane determination part 61 determines a recommended lane such that the vehicle M can travel on a reasonable travel route for proceeding to a branch destination.

The second map information 62 is map information having higher accuracy than the first map information 54. The second map information 62 includes, for example, information of the center of a lane, information of the boundary of a lane, or the like. The second map information 62 may include road information, traffic regulation information, address information (address and zip code), facility information, phone number information, and the like. The road information includes information that represents the class of a road such as a freeway, a toll road, a national road, or a prefectural road and information of the number of lanes of a road, the region of an emergency parking area, the width of each lane, the gradient of a road, the position of a road (three-dimensional coordinate including the longitude, latitude, and height), the curvature of a curve of a lane, the position of merging and branching points of a lane, a sign provided on a road, and the like. The second map information 62 may be updated as needed by accessing another apparatus using the communication device 20.

The vehicle sensor 70 includes a vehicle speed sensor that detects the speed of the vehicle M at a current time point, an acceleration sensor that detects acceleration with respect to the proceeding direction of the vehicle M, a yaw rate sensor that detects an angular speed around a vertical axis, an azimuth sensor that detects the direction of the vehicle M, and the like. The acceleration includes, for example, at least one of longitudinal acceleration with respect to the proceeding direction of the vehicle M and transverse acceleration with respect to the transverse direction of the vehicle M. The driving operation element 80 includes, for example, an accelerator pedal, a brake pedal, a shift lever, a steering wheel, and other operation elements. A sensor that detects the amount of operation or the presence or absence of operation is attached to the driving operation element 80. A detection result of the sensor of the driving operation element 80 is output to one or both of the automated driving control unit 100, and the travel drive force output device 200, the braking device 210 and the steering device 220.

[Automated Driving Control Unit]

The automated driving control unit 100 includes, for example, a first control part 120, a second control part 140, the interface control part 150, an operation element state change part 160, an occupant command determination part 170, and a storage part 180. Each of the first control part 120, the second control part 140, the interface control part 150, the operation element state change part 160, and the occupant command determination part 170 is realized by executing a program (software) by a processor such as a CPU (Central Processing Unit). Part or all of the functional parts of the first control part 120, the second control part 140, the interface control part 150, the operation element state change part 160, and the occupant command determination part 170 described below may be realized by hardware such as a LSI (Large-Scale Integration), an ASIC (Application-Specific Integrated Circuit), and a FPGA (Field-Programmable Gate Array) or may be realized by the cooperation of software and hardware. The combination of the first control part 120 and the second control part 140 is an example of an "automated driving control part". An outside recognition unit 121 is an example of a "circumstance situation recognition unit".

The first control part 120 includes, for example, the outside recognition unit 121, a vehicle position recognition unit 122, and an action plan generation unit 123.

The outside recognition unit 121 recognizes a state of the position, speed, acceleration, and the like of a peripheral vehicle on the basis of information that is input via the object recognition device 16 from the camera 10, the radar device 12, and the finder 14. The position of a peripheral vehicle may be represented by a representative point such as a center of gravity or a corner of the peripheral vehicle or may be represented by a region described by the outline of the peripheral vehicle. The "state" of a peripheral vehicle may include the acceleration, jerk, or "action state" (for example, whether or not the peripheral vehicle is changing a lane, or whether or not the peripheral vehicle will change a lane) of the peripheral vehicle.

The outside recognition unit 121 may recognize positions of a guardrail, a power pole, a parked vehicle, a person such as a pedestrian, and other objects in addition to a peripheral vehicle.

The vehicle position recognition unit 122 recognizes, for example, the lane (travel lane) on which the vehicle M is travelling, and the relative position and attitude of the vehicle M with respect to the travel lane. The vehicle position recognition unit 122 recognizes the travel lane, for example, by comparing a pattern (for example, an arrangement of a solid line and a dashed line) of a road partition line that is obtained from the second map information 62 to a pattern of a road partition line around the vehicle M that is recognized from the image captured by the camera 10. The position of the vehicle M that is acquired from the navigation device 50 and the process result by the INS may be added to this recognition.

Figure 2:
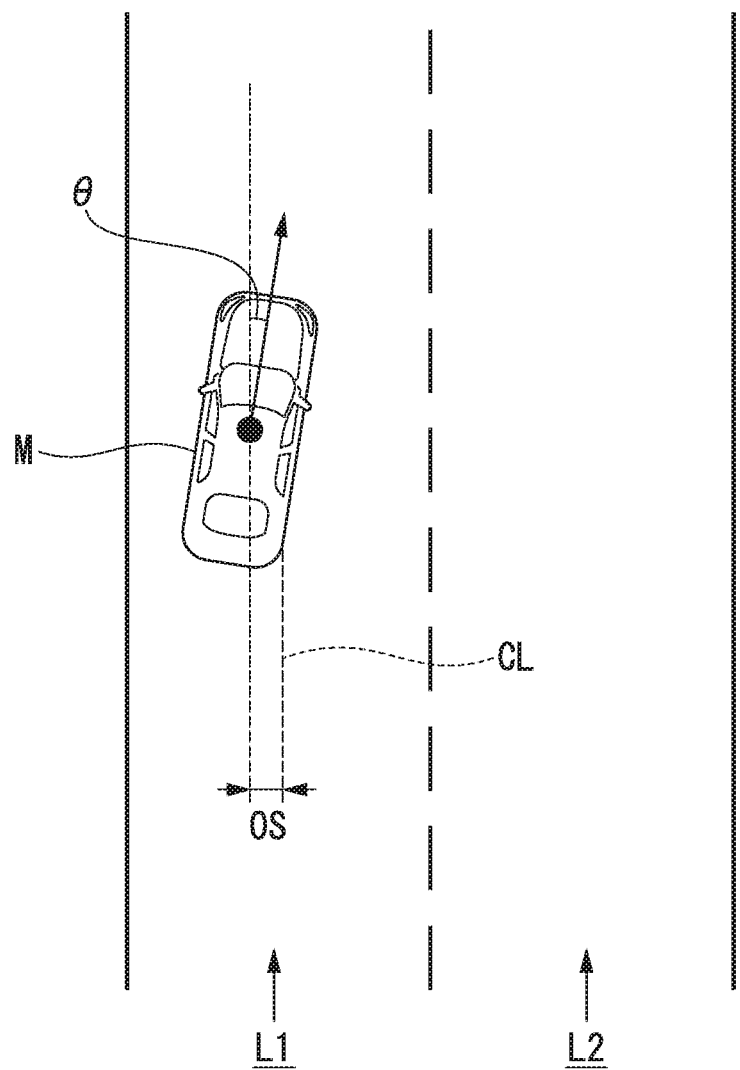
FIG. 2 is a view showing a state in which a relative position and an attitude of a vehicle with respect to a travel lane are recognized by a vehicle position recognition unit.

Then, the vehicle position recognition unit 122 recognizes, for example, the position and the attitude of the vehicle M with respect to the travel lane. FIG. 2 is a view showing a state in which the relative position and the attitude of the vehicle M with respect to a travel lane L1 are recognized by the vehicle position recognition unit 122. For example, the vehicle position recognition unit 122 recognizes, as the relative position and the attitude of the vehicle M with respect to the travel lane L1, a gap OS of a reference point (for example, the center of gravity) of the vehicle M from a travel lane center CL and an angle θ that is formed of the proceeding direction of the vehicle M and a line formed of the continued travel lane centers CL. Alternatively, the vehicle position recognition unit 122 may recognize, as the relative position of the vehicle M with respect to the travel lane, the position of the reference point of the vehicle M with respect to any of side end parts of the travel lane L1 and the like. The relative position of the vehicle M that is recognized by the vehicle position recognition unit 122 is supplied to the recommended lane determination part 61 and the action plan generation unit 123.

The action plan generation unit 123 generates an action plan for the vehicle M to perform automated driving with respect to a destination and the like. For example, the action plan generation unit 123 determines events that are sequentially performed in an automated driving control so as to travel on the recommended lane that is determined by the recommended lane determination part 61 and so as to be capable of responding to peripheral circumstances of the vehicle M. Examples of the event in the automated driving of the first embodiment include a constant speed travel event of traveling on the same travel lane at a constant speed, a lane-change event of changing the travel lane of the vehicle M, an overtaking event of overtaking a frontward traveling vehicle, a follow-up travel event of traveling while following up a frontward traveling vehicle, a merging event that causes the vehicle to merge at a merging point, a branching event that causes the vehicle M to travel to a target direction at a branching point of a road, an emergency stop event that causes the vehicle M to stop urgently, and a switch event for finishing automated driving and switching to manual driving. Further, an action for avoidance may be planned on the basis of peripheral circumstances (presence of a peripheral vehicle or a pedestrian, lane narrowing due to a roadwork, and the like) of the vehicle M while performing the events.

The action plan generation unit 123 generates a target trajectory on which the vehicle M will travel. The target trajectory includes, for example, a speed element. For example, a plurality of future reference times are set at each predetermined sampling time (for example, about several hundred milliseconds), and the target trajectory is generated as a set of target points (trajectory points) at which the vehicle should arrive at the reference times. Therefore, when the spacing of the trajectory points is large, the large spacing of the trajectory points indicates that the vehicle travels in a zone between the trajectory points at a high speed.

Figure 3:
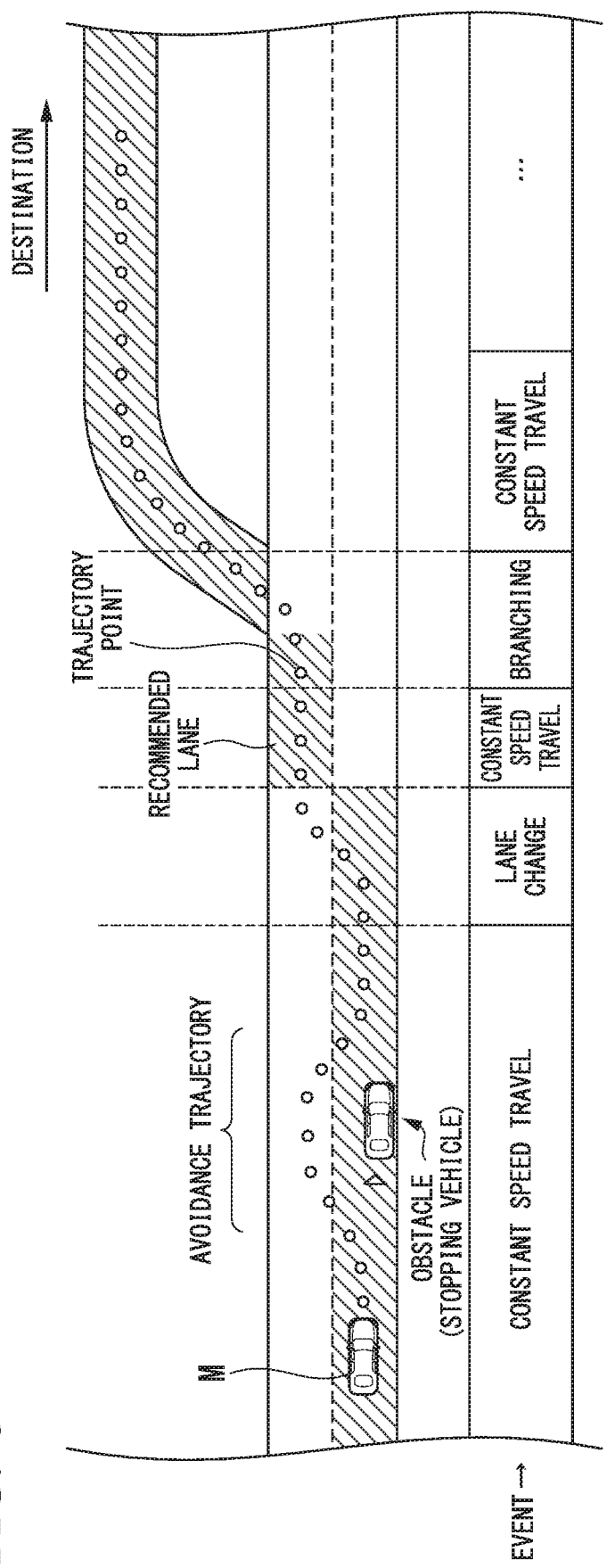
FIG. 3 is a view showing a state in which a target trajectory is generated on the basis of a recommended lane.

FIG. 3 is a view showing a state in which a target trajectory is generated on the basis of a recommended lane. As shown in FIG. 3, the recommended lane is set such that it is convenient to travel along a route to a destination.

When arriving at a position (the position may be determined in accordance with the category of an event) by a predetermined distance before a position at which the recommended lane is switched, the action plan generation unit 123 starts a lane-change event, a branching event, a merging event, and the like. When it becomes necessary to avoid an obstacle while performing the events, an avoidance trajectory is generated as shown in the drawing.

The action plan generation unit 123 generates, for example, a plurality of candidates of the target trajectory and selects an optimum target trajectory that is suitable for the route to the destination at that time point on the basis of a point of view of safety and efficiency. The action plan generation unit 123 changes the target trajectory on the basis of command contents from an occupant that are received by the alternative operation reception part, for example, when the vehicle M is in automated driving and when the driving operation element 80 is disabled.

The second control part 140 includes, for example, a travel control unit 141 and a switch control unit 142. The travel control unit 141 controls the travel drive force output device 200, the braking device 210, and the steering device 220 such that the vehicle M passes through the target trajectory that is generated by the action plan generation unit 123 exactly at a scheduled time.

The switch control unit 142 switches the drive mode of the vehicle M on the basis of the action plan that is generated by the action plan generation unit 123. For example, the switch control unit 142 switches the drive mode from manual driving to automated driving at a scheduled start point of automated driving. The switch control unit 142 switches the drive mode from automated driving to manual driving at a scheduled end point of automated driving.

During manual driving, input information from the driving operation element 80 is output to the travel drive force output device 200, the braking device 210, and the steering device 220. The input information from the driving operation element 80 may be output via the automated driving control unit 100 to the travel drive force output device 200, the braking device 210, and the steering device 220. Each of ECUs (Electronic Control Unit) of the travel drive force output device 200, the braking device 210, and the steering device 220 performs an operation on the basis of the input information from the driving operation element 80 and the like.

The interface control part 150 causes the information output part 40 to output a travel state during automated driving or during manual driving of the vehicle M, a timing at which automated driving and manual driving are mutually switched, notification regarding a request and the like for causing an occupant to perform manual driving, and the like. The interface control part 150 may cause the information output part 40 to output the determination result of the occupant command determination part 170.

The operation element state change part 160 disables the driving operation element 80 when the vehicle M is performing automated driving at a drive mode having a high degree of automated driving in which, for example, all of vehicle controls such as a complex merging control are automatically performed. The disabled state is, for example, a state in which the driving operation element 80 is stored in a storage area. The operation element state change part 160 causes the driving operation element 80 that is stored in the storage area to return to an original position and enables the driving operation element 80 for the occupant when the vehicle M is performing automated driving at a drive mode having a low degree of automated driving in which, for example, part of vehicle controls is manually performed or when automated driving is switched to manual driving. Details of the function of the operation element state change part 160 are described below.

The occupant command determination part 170 receives an operation which is different from the operation with respect to the driving operation element 80 when the driving operation element 80 is disabled by the operation element state change part 160. In this case, the occupant command determination part 170 receives, for example, a non-contact operation by an occupant as the different operation. The occupant command determination part 170 includes, for example, a gesture recognition unit 171 and a speech recognition unit 172. The gesture recognition unit 171 recognizes the motion of the occupant as a gesture and receives an operation that corresponds to the recognized gesture. For example, the gesture recognition unit 171 analyzes the motion of the occupant from image information that is captured by the vehicle room inside camera 31 and determines the command content from the occupant from the result that is recognized by the analysis. The gesture recognition unit 171 analyzes, for example, speech information that is acquired by the microphone 32 and determines the command content of the occupant from the result that is recognized by the analysis. Details of the function of the occupant command determination part 170 are described below.

The storage part 180 is a storage device such as an HDD (Hard Disk Drive), a flash memory, a RAM (Random Access Memory), a ROM (Read Only Memory), and the like. The storage part 180 stores information relating to an automated driving control of the embodiment. The storage part 180 stores a command determination table 181. Details of the command determination table 181 are described below.

The travel drive force output device 200 outputs, to a drive wheel, a travel drive force (torque) by which the vehicle M travels. The travel drive force output device 200 includes, for example, the combination of an internal combustion engine, an electric motor, a transmission, and the like and an ECU that controls the internal combustion engine, the electric motor, the transmission, and the like. The ECU controls the above configuration in accordance with information that is input from the travel control unit 141 or information that is input from the driving operation element 80.

The braking device 210 includes, for example, a brake caliper, a cylinder that transmits an oil pressure to the brake caliper, an electric motor that generates the oil pressure at the cylinder, and a brake ECU. The brake ECU controls the electric motor in accordance with the information that is input from the travel control unit 141 or the information that is input from the driving operation element 80 and outputs a braking torque corresponding to a braking operation to each wheel. The braking device 210 may include, as a backup, a mechanism that transmits, to the cylinder via a master cylinder, an oil pressure that is generated by an operation of the brake pedal which is included in the driving operation element 80. The braking device 210 is not limited to the configuration described above and may be an electronically-controlled hydraulic braking device that controls an actuator in accordance with the information which is input from the travel control unit 141 or the information that is input from the driving operation element 80 and that transmits the oil pressure of the master cylinder to the cylinder. The braking device 210 may include a plurality of braking device systems in consideration of safety.

The steering device 220 includes, for example, a steering ECU and an electric motor.

For example, the electric motor applies a force to a rack and pinion mechanism and changes the direction of a steering wheel. The steering ECU drives the electric motor and changes the direction of the steering wheel in accordance with the information that is input from the travel control unit 141 or the information that is input from the driving operation element 80.

[Automated Driving Control when Driving Operation Element 80 is Disabled]

Figure 4:
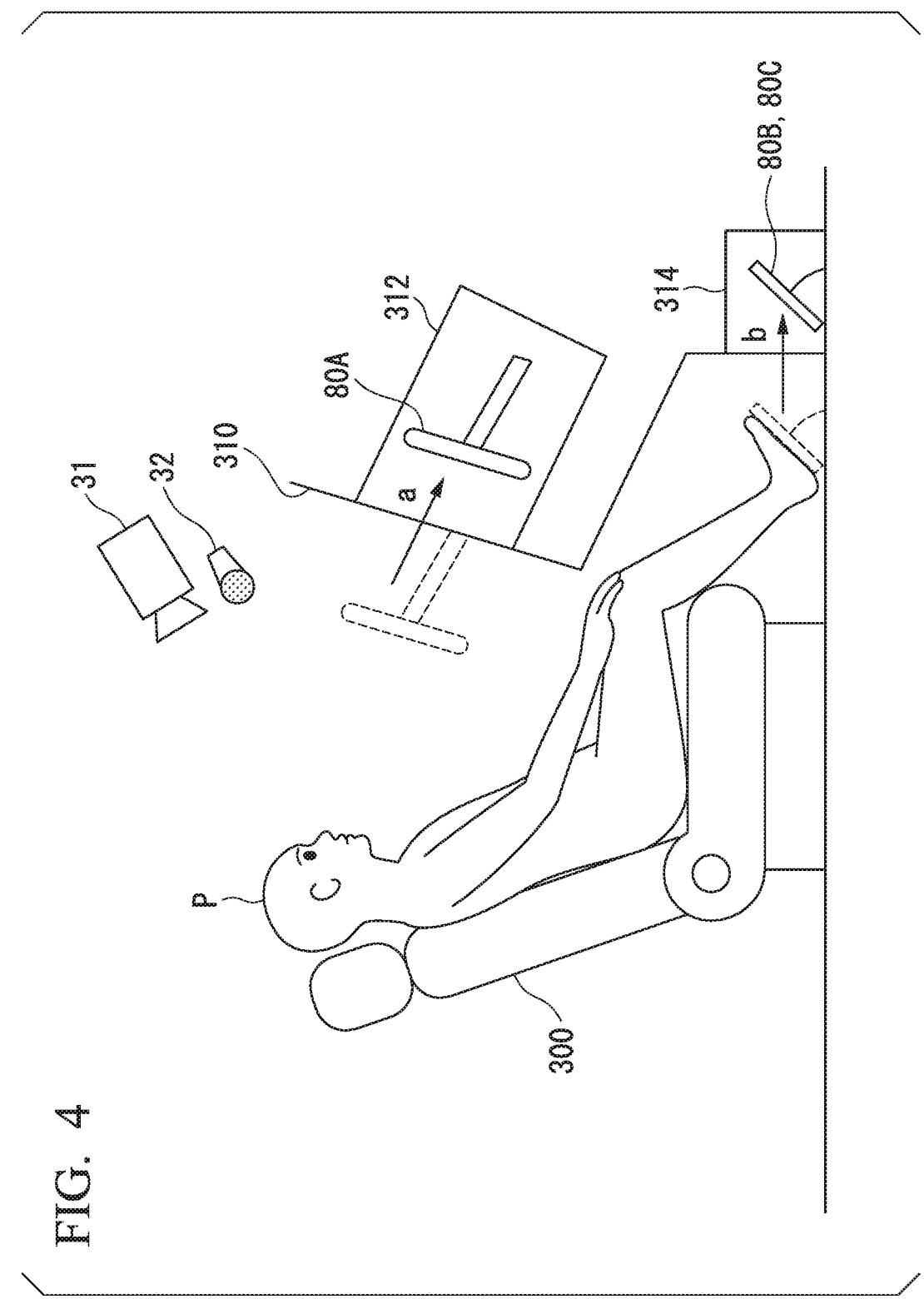
FIG. 4 is a view showing a state in which a driving operation element is stored in a storage area by an operation element state change part.

Next, the automated driving control when the driving operation element 80 is disabled is specifically described. FIG. 4 is a view showing a state in which the driving operation element 80 is stored in the storage area by the operation element state change part 160. FIG. 4 shows a state in which a steering wheel 80A, an accelerator pedal 80B, and a brake pedal 80C are stored as an example of the driving operation element 80.

The operation element state change part 160 moves the steering wheel 80A in an arrow "a" direction and stores the steering wheel 80A in a storage area 312 inside a garnish 310 when automated driving is performed at a drive mode having a high degree of automated driving in which, for example, all of vehicle controls are automatically performed. An opening part through which the steering wheel 80A is movable in the arrow "a" direction may be formed on the garnish 310. An openable door mechanism may be provided on the garnish 310.

The operation element state change part 160 moves the accelerator pedal 80B and the brake pedal 80C in an arrow "b" direction and stores the accelerator pedal 80B and the brake pedal 80C in a storage area 314 inside the garnish 310. An opening part through which the accelerator pedal 80B and the brake pedal 80C are movable in the arrow "b" direction may be formed on the garnish 310. An openable door mechanism may be provided on the garnish 310.

The operation element state change part 160 may store a shift lever and other operation elements in addition to the steering wheel 80A, the accelerator pedal 80B, and the brake pedal 80C.

The gesture recognition unit 171 detects the motion of an occupant P from the image of the occupant P that is captured by the vehicle room inside camera 31 when the steering wheel 80A, the accelerator pedal 80B, and the brake pedal 80C are stored by the operation element state change part 160. The gesture recognition unit 171 acquires a command content that is matched with the motion of the occupant P with reference to the command determination table 181 that is stored in the storage part 180.

FIG. 5 is a view showing the content of the command determination table 181. In the command determination table 181, the motion and speech of an occupant and a command content to the vehicle M are mutually associated. The motion of an occupant is a motion of a predetermined region of the body of the occupant such as a hand, a foot, a neck, and the like. The motion of an occupant may include information of a movement speed and a movement distance of a target region. The speech of an occupant is, for example, speech that is acquired by the microphone 32. The speech of an occupant may include information regarding the sound volume. The command content includes, for example, information for controlling at least one of acceleration/deceleration and steering of the vehicle M and changing the target trajectory that has already been generated in the action plan generation unit 123.

Figure 6:
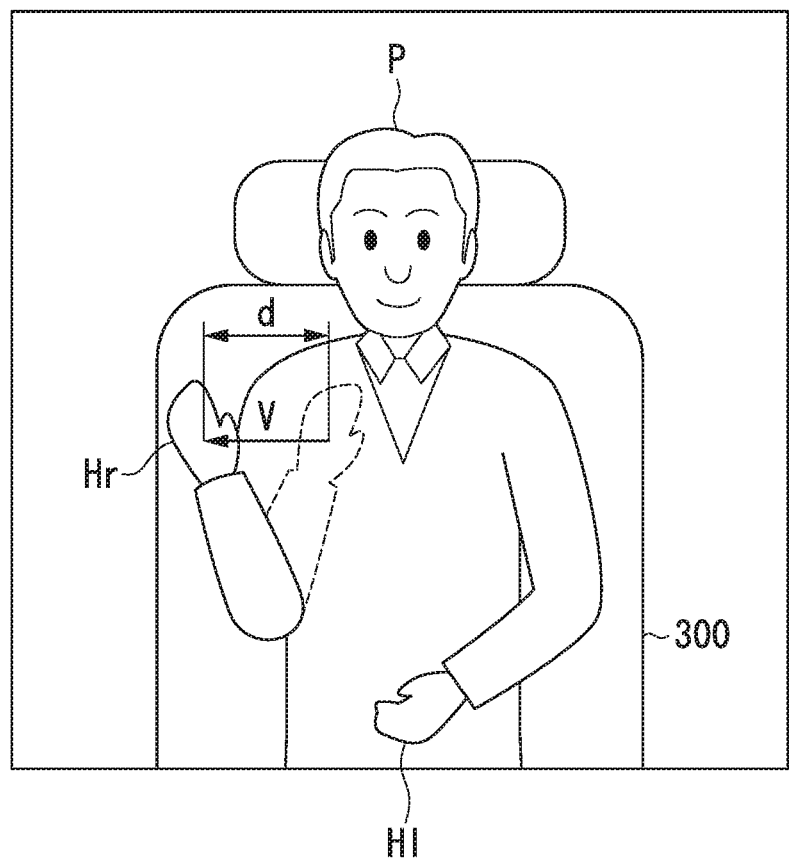
FIG. 6 is a view showing detecting the motion of an occupant.

FIG. 6 is a view showing detecting the motion of the occupant P. FIG. 6 is an image that is captured by the vehicle room inside camera 31. The gesture recognition unit 171 acquires the position of the hand of the occupant P who is seated on a driver's seat 300 from the image that is captured by the vehicle room inside camera 31. For example, the gesture recognition unit 171 analyzes, from the image that is captured by the vehicle room inside camera 31, the presence or absence of an object that is similar to the shape, size, and color information (for example, flesh color) of a hand that are preliminarily defined. When a similar object is included in the image, the gesture recognition unit 171 recognizes that the object is a hand and identifies the position of the object. The gesture recognition unit 171 acquires the movement speed and movement distance of the hand from time-series images and determines a command content to the vehicle M on the basis of the acquired movement speed and movement distance.

The vehicle control system 1 may include a motion sensor (not shown) used for motion determination in place of the vehicle room inside camera 31. The motion sensor includes, for example, an RGB camera and a depth sensor using infrared light, ultrasonic waves, and the like. The motion sensor recognizes the position of each region of the body of the occupant P on the basis of color information of each object inside the vehicle room that is obtained by the RGB camera and distance information to each object that is obtained by the depth sensor. The gesture recognition unit 171 identifies the position of the hand of the occupant from the position of each region of the occupant P that is obtained from the motion determination sensor. The gesture recognition unit 171 acquires the movement speed of the hand on the basis of the change amount of the position in a unit time. The gesture recognition unit 171 acquires a distance at which the hand has moved at a movement speed of a threshold value or more. The gesture recognition unit 171 determines a command content to the vehicle M on the basis of the acquired movement speed and movement distance. The motion sensor may be a simple one that includes only a plurality of infrared sensors.

For example, in FIG. 6, it is assumed that the occupant P who is seated on the driver's seat 300 moves a right hand Hr among right and left hands Hr, Hl at a speed V (V>Vth) by a distance d (D1<d<D2) in the right direction with respect to the occupant P. In this case, the gesture recognition unit 171 analyzes a captured image that is captured by the vehicle room inside camera 31, refers to the command determination table 181 on the basis of the motion of the occupant P that is recognized by the analysis, and acquires a command of a course change that causes the vehicle M to approach to and travel on the right side of the travel lane.

The occupant command determination part 170 may analyze speech that is obtained from the microphone 32 by the speech recognition unit 172 in place of (or in addition to) the analysis of the motion of the predetermined region of the body of the occupant P by the gesture recognition unit 171 and may acquire a speech content and a sound volume. In this case, the speech recognition unit 172 refers to the command determination table 181 on the basis of the speech content and the sound volume and acquires a command content that is matched with the condition of the speech content and the sound volume.

The occupant command determination part 170 can prevent an erroneous determination of a command by performing a command determination on the basis of the condition of both the motion and speech of the occupant P. In this case, the occupant command determination part 170 may exclude conditions of a threshold value of the movement speed with respect to the motion and a threshold value of the sound volume with respect to speech and may determine a command content.

The first control part 120 generates a target trajectory used for performing automated driving the causes that vehicle to approach to and travel on the right side of the travel lane on the basis of the command content that is determined by the occupant command determination part 170 and performs automated driving that changes to the newly generated target trajectory and causes the vehicle to travel along the target trajectory.

Figure 7:
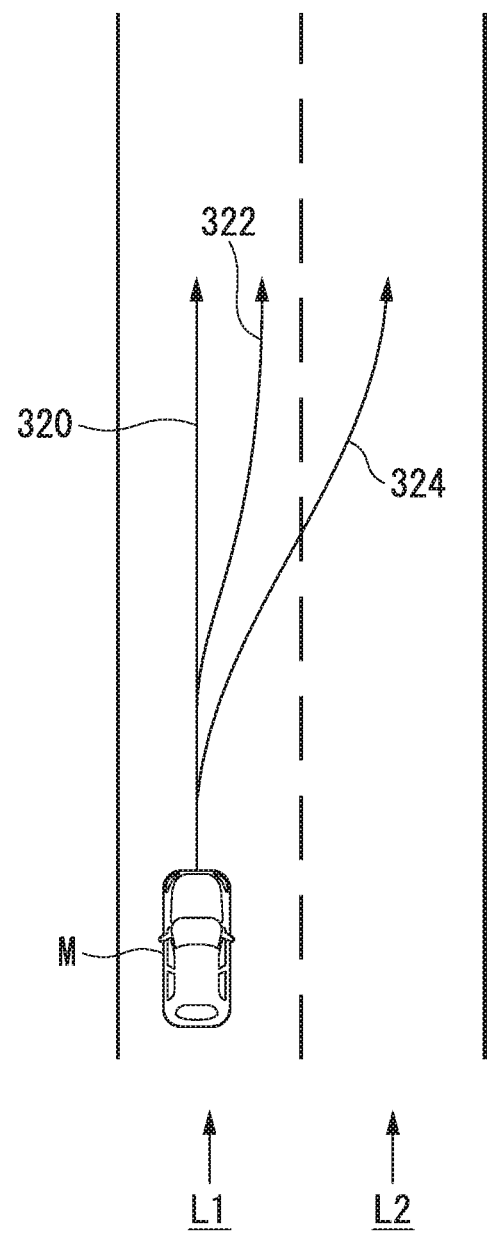
FIG. 7 is a view showing a state in which a target trajectory on which a vehicle travels is changed.

FIG. 7 is a view showing a state in which a target trajectory on which a vehicle M travels is changed. A target trajectory 320 is a target trajectory that is generated by the action plan generation unit 123 before receiving the command content that is determined by the occupant command determination part 170. When receiving the command content that is determined by the occupant command determination part 170, the action plan generation unit 123 changes the target trajectory 320 on the basis of the command content. For example, the action plan generation unit 123 generates a target trajectory 322 for approaching to the right side of a travel lane L1 and traveling on the right side of the travel lane L1 on the basis of the command content that is obtained from the motion of the occupant P shown in FIG. 6.

In the example of FIG. 6, when a movement distance D of the right hand Hr of the occupant P is equal to or more than a threshold value D2, the occupant command determination part 170 determines that a command to perform a lane change to a lane L2 on the right side of the travel lane L1 of the vehicle M is received. In this case, the action plan generation unit 123 generates a target trajectory 324 used for causing the vehicle M to perform a lane change to the lane L2. In this way, the occupant P performs a predetermined motion and thereby can perform automated driving in which the target trajectory is changed. The occupant P performs the motion with respect to acceleration/deceleration of the vehicle M that is defined in the command determination table 181 or produces speech and thereby can perform a command with respect to an acceleration/deceleration control of the vehicle M.

Figure 8:
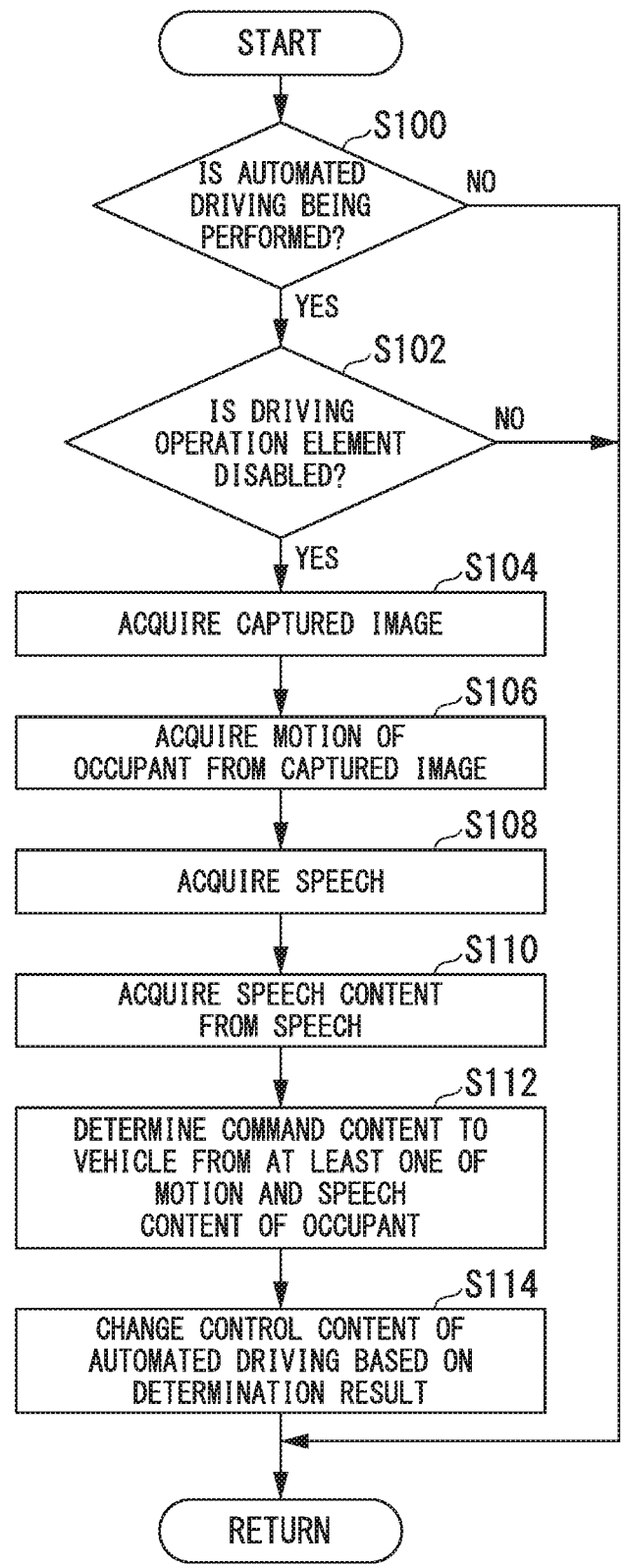
FIG. 8 is a flowchart showing the flow of an automated driving control process in the first embodiment.

FIG. 8 is a flowchart showing the flow of an automated driving control process in the first embodiment. The example of FIG. 8 shows an example in which the content of the automated driving control is changed on the basis of the motion of the occupant. The process of FIG. 8 is repeatedly performed at a predetermined timing or a period. The first control part 120 determines whether or not automated driving is being performed (Step S100). When automated driving is being performed, the occupant command determination part 170 determines whether or not the driving operation element 80 is disabled (Step S102). When the driving operation element 80 is disabled, the occupant command determination part 170 acquires a captured image that includes the occupant P by the vehicle room inside camera 31 (Step S104), analyzes the acquired captured image, and acquires the motion of the occupant P that is recognized by the analysis (Step S106).

Next, the occupant command determination part 170 acquires speech inside the vehicle room from the microphone 32 (Step S108), analyzes the acquired speech, and acquires the speech content of the occupant P that is recognized by the analysis (Step S110). Next, the occupant command determination part 170 refers to the command determination table 181 and determines a command content with respect to the vehicle M from at least one of the motion or the speech content of the occupant P (Step S112). The first control part 120 changes the control content of automated driving on the basis of the determination result by the occupant command determination part 170 (Step S114), and the process of the present flowchart is finished. When automated driving is not being performed, or when the driving operation element 80 is not disabled, the process of the present flowchart is finished.

According to the first embodiment described above, the vehicle control system 1 can perform a vehicle control during automated driving by receiving an operation which is different from the operation with respect to the driving operation element 80 by the occupant P when the driving operation element 80 is disabled. Accordingly, for example, when performing emergency avoidance with respect to an obstacle, the occupant P can perform a command such as a course change or stop to the vehicle M without waiting for a time to enable the driving operation element 80 from a disabled state.

Second Embodiment

Next, a vehicle control system of the second embodiment is described. The vehicle control system of the second embodiment receives an operation which is different from the operation with respect to the driving operation element 80 by the occupant P when a switch unit that is provided on the vehicle M is operated. In the following, the same name and reference sign are used for a configuration that includes a function similar to that of the vehicle control system 1 of the first embodiment, and specific description is omitted.

Figure 9:
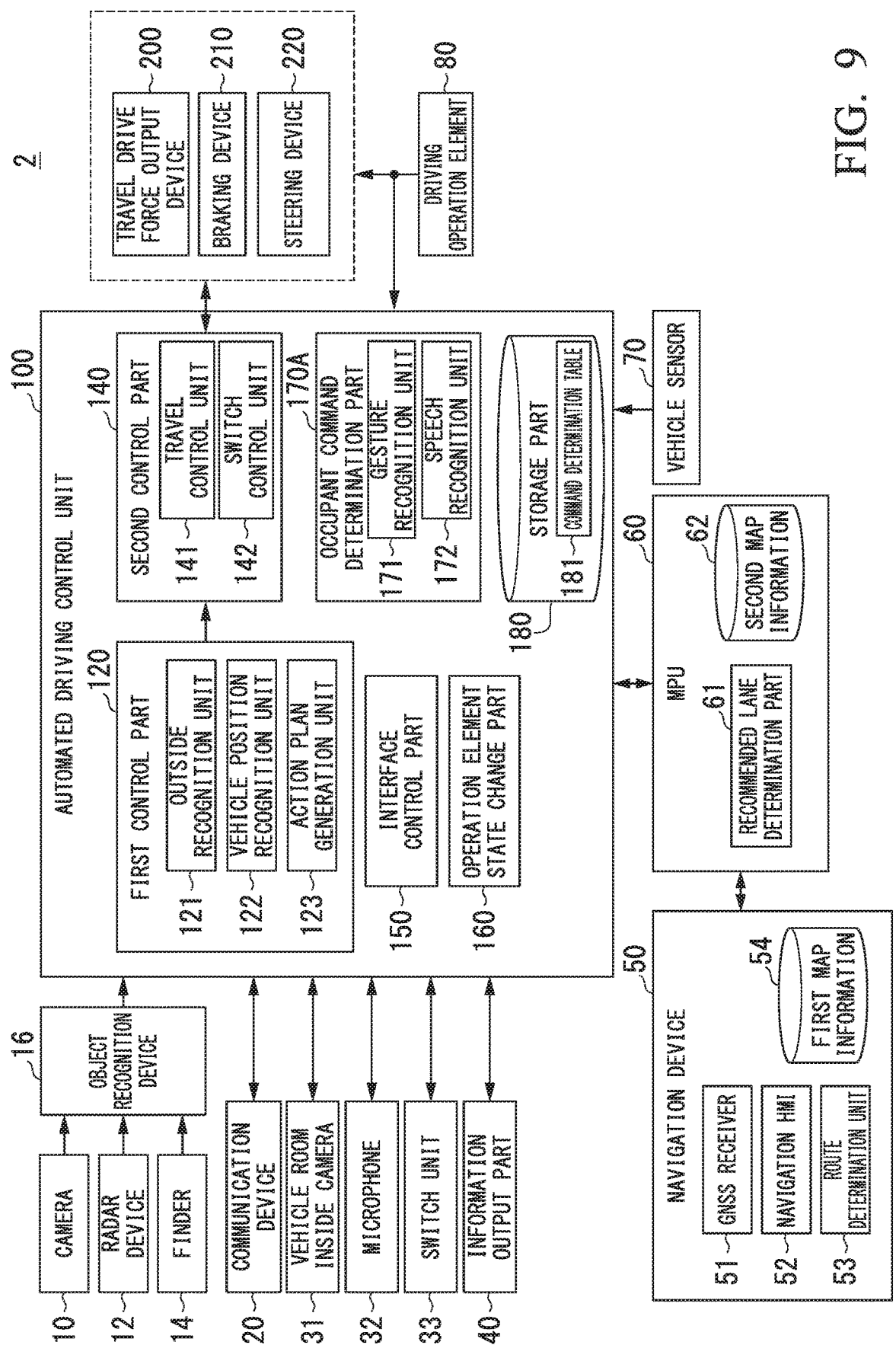
FIG. 9 is a configuration view of a vehicle control system of a second embodiment.

FIG. 9 is a configuration view of a vehicle control system 2 of the second embodiment. In comparison with the vehicle control system 1 of the first embodiment, the vehicle control system 2 is different in that the vehicle control system 2 includes a switch unit 33 and includes an occupant command determination part 170A in place of the occupant command determination part 170. Accordingly, in the following, the configuration of the switch unit 33 and the occupant command determination part 170A is mainly described.

The switch unit 33 receives, for example, an operation by the driver and the like. The switch unit 33 is, for example, a mechanical switch that is provided on a garnish (dashboard). The switch unit 33 may be a GUI (Graphical User Interface) switch that is provided on a touch panel of the navigation device 50 or may be a mechanical switch that is provided on a seat.

The occupant command determination part 170A performs a command determination on the basis of at least one of the motion and speech of the occupant P when an operation by the occupant P is being applied on the switch unit 33 in a case where the vehicle M is in automated driving and the driving operation element 80 is disabled. The occupant command determination part 170A does not perform the command determination when the operation is not being applied.

The occupant command determination part 170A performs a command determination on the basis of at least one of the motion of the occupant P and speech of the occupant P before a predetermined period of time elapses since an operation by the occupant P is applied on the switch unit 33 in a case where the vehicle M is in automated driving and the driving operation element 80 is disabled. The occupant command determination part 170A does not perform the command determination after the predetermined period of time elapses since the operation is applied.

Figure 10:
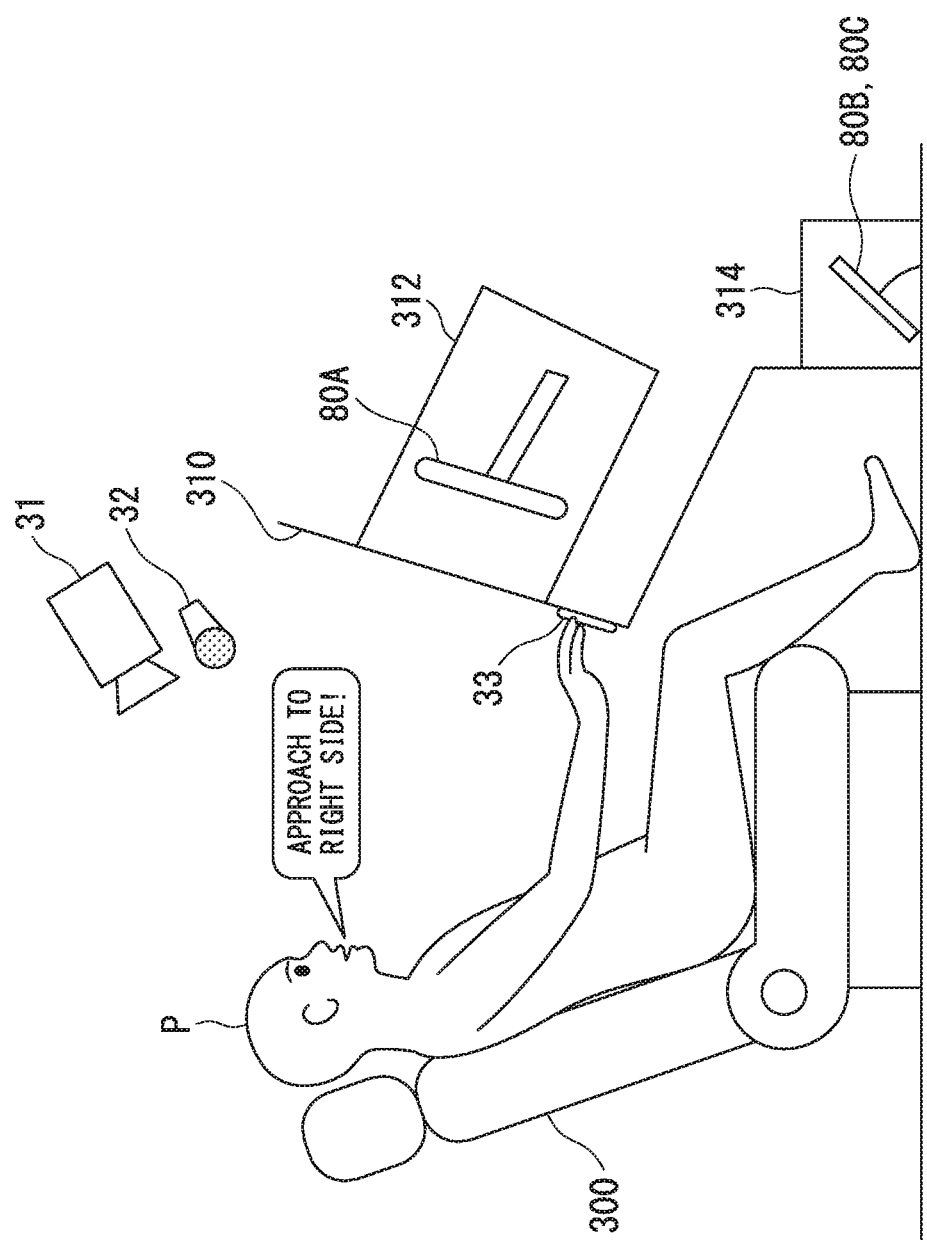
FIG. 10 is a view showing performing a command to automated driving by speech in a state where the occupant is operating a switch unit.

FIG. 10 is a view showing performing a command to automated driving by speech in a state where the occupant P is operating the switch unit 33. In FIG. 10, the switch unit 33 is provided on the garnish 310. The switch unit 33 is, for example, a switch that is capable of being switched to any of ON and OFF states. The switch unit 33 receives that the switch is switched to the ON state by the occupant. The occupant command determination part 170A analyzes the motion of the occupant on the basis of the captured image that is captured using the vehicle room inside camera 31 by the gesture recognition unit 171 during the switch unit 33 is switched to the ON state and analyzes the speech content and the sound volume on the basis of speech information that is acquired from the microphone 32 by the speech recognition unit 172. When the occupant P produces speech "Approach to the right side!", the occupant command determination part 170A analyzes the speech and the sound volume and acquires a command content that is matched with the content of speech and the sound volume with reference to the command determination table 181.

The first control part 120 generates a target trajectory by which acceleration/deceleration of the vehicle is performed on the basis of the command content that is determined by the occupant command determination part 170A and performs automated driving on the basis of the generated target trajectory.

Figure 11:
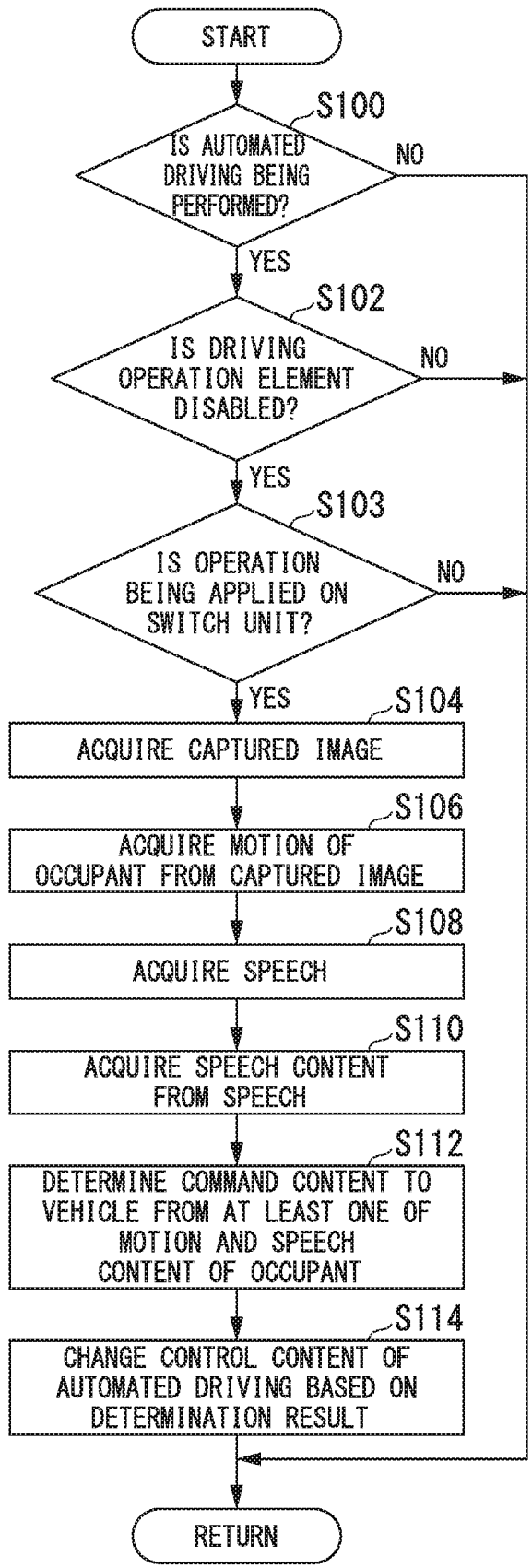
FIG. 11 is a flowchart showing the flow of an automated driving control process in the second embodiment.

FIG. 11 is a flowchart showing the flow of an automated driving control process in the second embodiment. In comparison with the flowchart shown in FIG. 8, the flowchart shown in FIG. 11 is different in that Step S103 is added between Step S102 and Step S104. Accordingly, in the following, the process of Step S103 is mainly described.

In the process of Step S102, when the driving operation element 80 is disabled, the occupant command determination part 170A determines whether or not an operation is being applied on the switch unit 33 (Step S103). When an operation is being applied on the switch unit 33, the occupant command determination part 170A performs the process of Step S104 and the subsequent processes. When an operation is not being applied on the switch unit 33, the process of the present flowchart is finished.

As described above, according to the vehicle control system 2 of the second embodiment, the command content from the occupant P is determined when an operation is being applied on the switch unit 33, and therefore, it is possible to prevent an erroneous determination of the command from the occupant P in addition to providing an advantage which is similar to the first embodiment. Further, it is not necessary to perform an analysis of the motion and speech of the occupant in a state where an operation is not being applied on the switch unit 33, and therefore, it is possible to reduce the process regarding the command determination compared to the first embodiment.

Third Embodiment

Next, a vehicle control system of the third embodiment is described. The vehicle control system of the third embodiment controls at least one of acceleration/deceleration and steering of the vehicle M on the basis of a detection content of a tread detection sensor that is provided on the vehicle M. In the following, the same names and reference signs are used for a configuration that includes functions similar to those of the vehicle control system 2 of the second embodiment, and specific descriptions are omitted.

Figure 12:
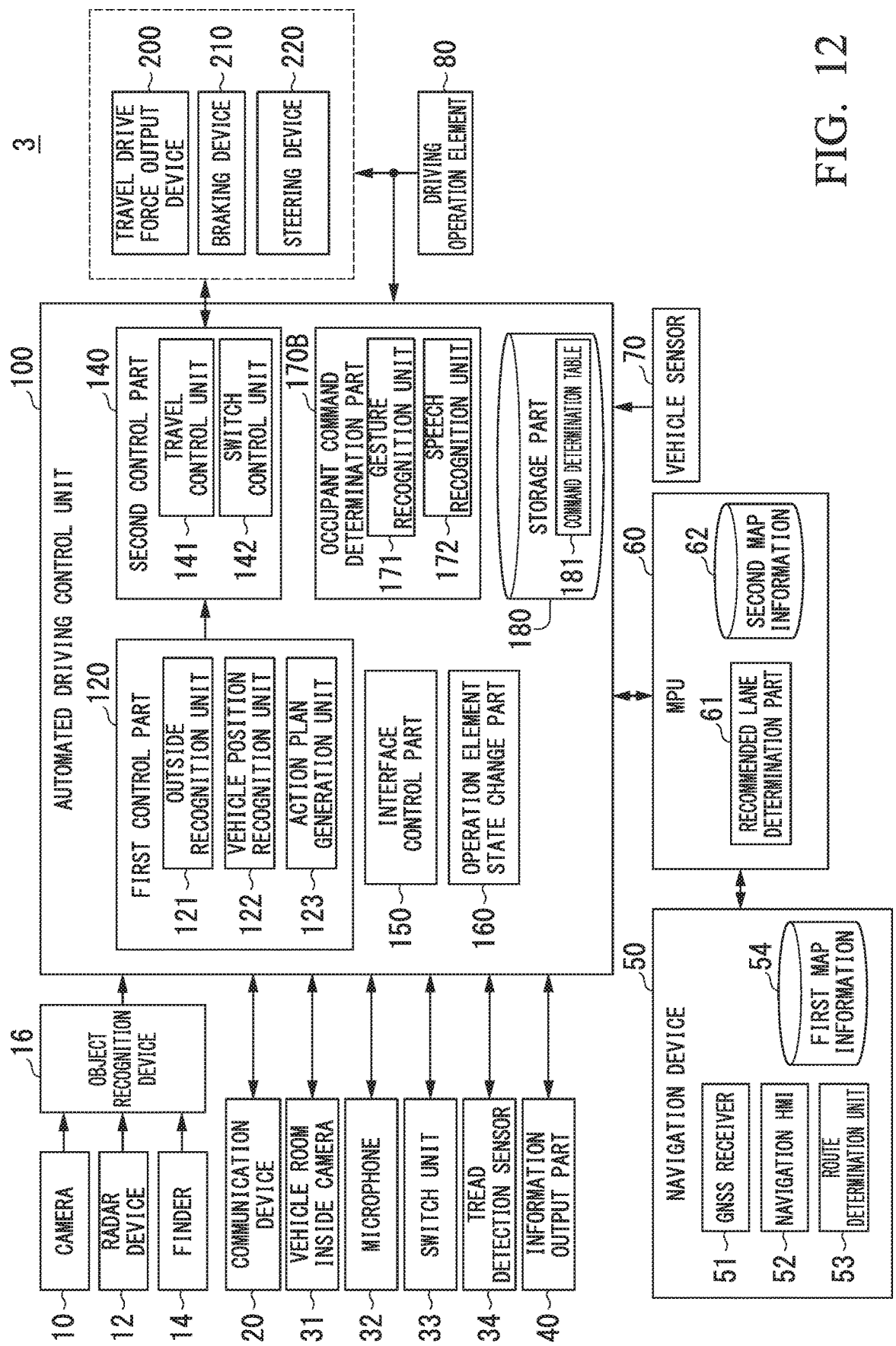
FIG. 12 is a configuration view of a vehicle control system of a third embodiment.

FIG. 12 is a configuration view of a vehicle control system 3 of the third embodiment. In comparison with the vehicle control system 2 of the second embodiment, the vehicle control system 3 is different in that the vehicle control system 3 includes a tread detection sensor 34 and includes an occupant command determination part 170B in place of the occupant command determination part 170A. Accordingly, in the following, the configuration of the tread detection sensor 34 and the occupant command determination part 170B is mainly described.

Figure 13:
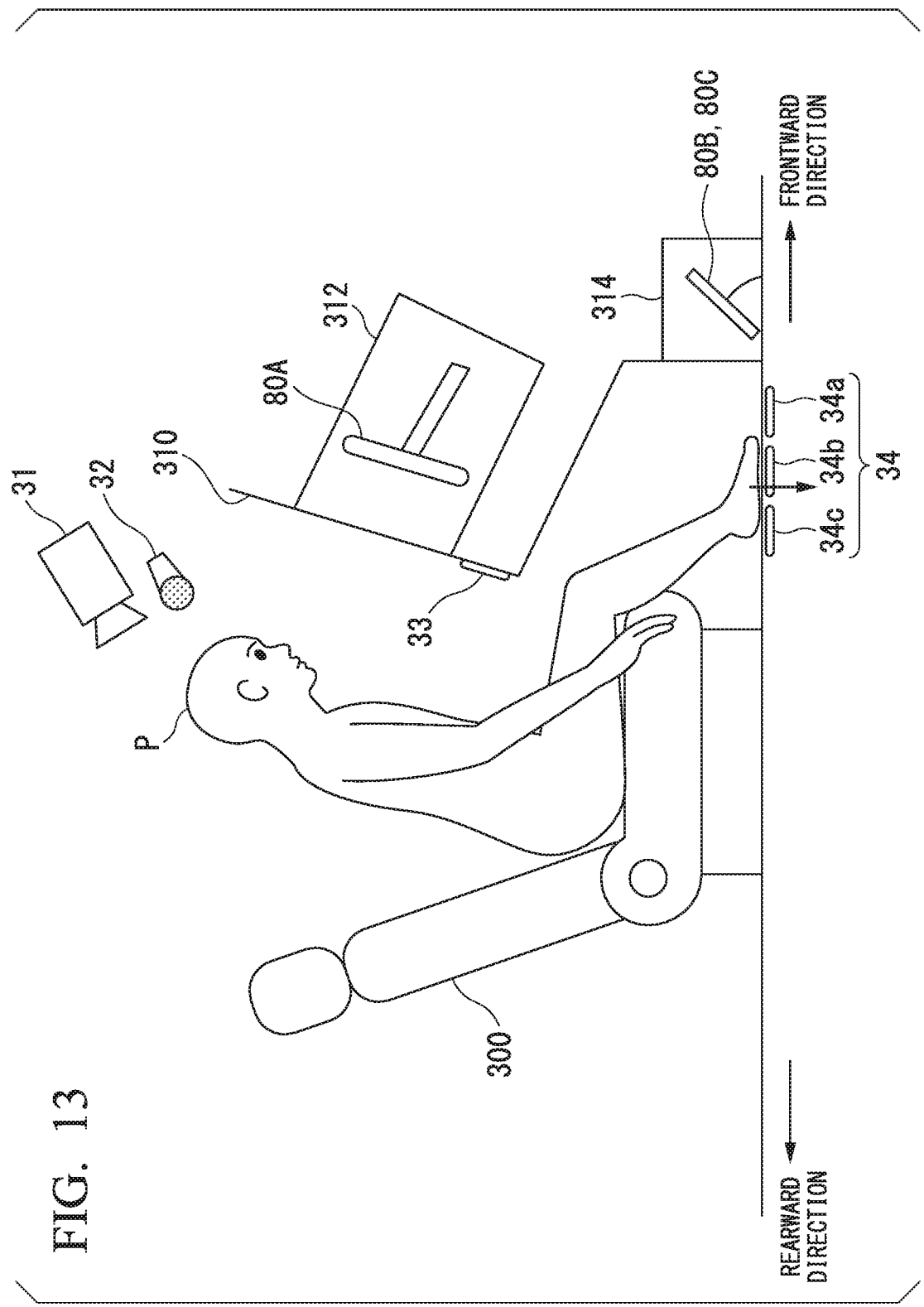
FIG. 13 is a view showing an arrangement example of a tread detection sensor.

FIG. 13 is a view showing an arrangement example of the tread detection sensor 34. The tread detection sensor 34 is arranged, for example, under a floor at a frontward position of the driver's seat 300 that is provided inside the vehicle room. The tread detection sensor 34 may include a plurality of tread detection sensors 34a to 34c that are aligned from a frontward position to a rearward position of a floor surface. A light emission part may be provided on the tread detection sensor 34 so as to be seen by the occupant P who is seated on the driver's seat 300. An opening part may be provided on the floor surface such that the tread detection sensor 34 can be seen.

The tread detection sensor 34 detects the magnitude of the pressure from the floor surface. The tread detection sensor 34 outputs detection of the pressure when the detected pressure becomes equal to or more than a threshold value to the occupant command determination part 170B.

The occupant command determination part 170B determines whether or not tread is detected from at least one of the tread detection sensors 34a to 34c when the vehicle M is in automated driving and the driving operation element 80 is disabled. When tread is detected from at least one of the tread detection sensors 34a to 34c, the occupant command determination part 170B determines whether or not a command for controlling acceleration/deceleration of the vehicle M by automated driving is made.

For example, the occupant command determination part 170B determines that a command of a deceleration control in which the vehicle M is decelerated is made when detecting that the tread detection sensor 34b is trodden. When detecting that the tread detection sensor 34a is trodden, the occupant command determination part 170B determines that a command to perform a deceleration control in which the degree of deceleration is increased compared to the deceleration when detecting that the tread detection sensor 34b is trodden. The large degree of deceleration is, for example, a deceleration control such as sudden braking or sudden stopping. The occupant command determination part 170B determines that a command to control the vehicle M to accelerate by automated driving is made when the tread detection sensor 34c is trodden. When detecting that two or more of the tread detection sensors 34a to 34c are trodden, the occupant command determination part 170B prioritizes a tread detection sensor of which the detected pressure is the largest.

The first control part 120 generates a target trajectory by which acceleration/deceleration of the vehicle is performed on the basis of the command content that is determined by the occupant command determination part 170B and performs automated driving on the basis of the generated target trajectory.

Figure 14:
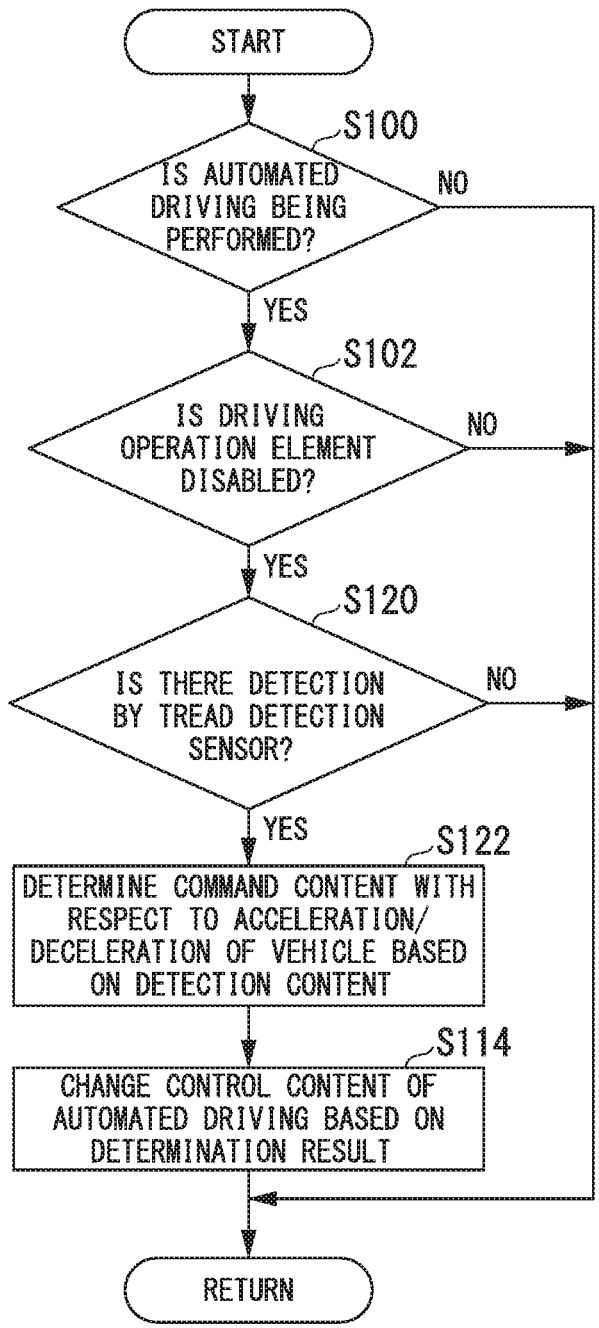
FIG. 14 is a flowchart showing the flow of an automated driving control process in the third embodiment.

FIG. 14 is a flowchart showing the flow of an automated driving control process in the third embodiment. In comparison with the flowchart shown in FIG. 11, Steps S120 and S122 in place of Steps S103 to S112 are added to the flowchart shown in FIG. 14. Accordingly, in the following, the processes of Steps S120 and S122 are mainly described.

In the process of Step S102, when the driving operation element 80 is disabled, the occupant command determination part 170B determines whether or not there is a detection by the tread detection sensor 34 (Step S120). When there is a detection by the tread detection sensor 34, a command content with respect to the acceleration/deceleration of the vehicle M is determined on the basis of the detection content (Step S122). Next, the first control part 120 changes the control content of automated driving on the basis of the determination result (Step S114) and finishes the process of the present flowchart. When there is not a detection by the tread detection sensor 34, the process of the present flowchart is finished.

The occupant command determination part 170B may perform not only a control of acceleration/deceleration of the vehicle M but a control relating to steering on the basis of the detection result by the tread detection sensor 34. In this case, the occupant command determination part 170B performs a course change to the right side of the travel lane when the tread detection sensor 34a detects a pressure and performs a course change to the left side of the travel lane when the tread detection sensor 34c detects a pressure.

As described above, according to the vehicle control system 3 of the third embodiment, it is possible to perform a command with respect to at least one of acceleration/deceleration and steering of the vehicle M in a non-contact state with the driving operation element 80 by using the tread detection sensor 34. A configuration which is similar to the tread detection sensor 34 may be provided on part (for example, an armrest or a side surface of a seating part) of a seat apparatus on which the occupant is seated and may be operated by the occupant using a finger. A command with respect to at least one of acceleration/deceleration and steering of the vehicle M may be performed by operating a sensor. Each of the first to third embodiments described above may be combined with part of or all of other embodiments.

Modified Example

Next, a modified example of the vehicle control systems of the first to third embodiments is described. For example, the outside recognition unit 121 that is included in the first control part 120 may perform a risk determination of whether or not there is a risk for the vehicle M to collide with a peripheral vehicle, a guardrail, a power pole, a parked vehicle, a person such as a pedestrian, other objects, and the like that are recognized. In this case, when the driving operation element 80 is disabled, the outside recognition unit 121 makes the degree higher compared to the risk determination when the driving operation element 80 is operable.

For example, when the driving operation element 80 is disabled, the outside recognition unit 121 enlarges a range in which an object that is present in the vicinity of the vehicle M is recognized compared to a range in a case where the driving operation element 80 is operable. When the driving operation element 80 is disabled, the outside recognition unit 121 may make the degree of certainty of object recognition by the object recognition device 16 lower than the degree of certainty of object recognition in a case where the driving operation element 80 is operable and may recognize more objects. In this way, when the driving operation element 80 is disabled, the degree of risk determination of a collision is made high, and thereby, it is possible to perform a safer vehicle control.

When it is determined that there is a risk of an object in the vicinity of the vehicle M colliding with the vehicle M in a state where the degree of risk determination of a collision is made high, the outside recognition unit 121 outputs, to the information output part 40, that there is a risk of the object in the vicinity of the vehicle M colliding with the vehicle M. Thereby, when the driving operation element 80 is disabled, the occupant P can perform a command for promptly changing the target trajectory by using the alternative operation reception part.

Although embodiments of the invention have been described with reference to the drawings, the present invention is not limited to the embodiments, and a variety of changes and substitutions can be added without departing from the scope of the invention.

What is claimed is:

1. A vehicle control system comprising:
an automated driving control part that performs automated driving in which at least one of acceleration/deceleration and steering of a vehicle is automatically controlled;
a driving operation element that receives an operation of an occupant with respect to acceleration/deceleration and steering of the vehicle during performing manual driving;
an operation element state change part that makes the driving operation element disabled when the automated driving by the automated driving control part is performed; and
an alternative operation reception part that receives an operation which is different from the operation with respect to the driving operation element by the occupant when the driving operation element is disabled by the operation element state change part,
wherein the automated driving control part controls at least one of acceleration/deceleration and steering of the vehicle based on the operation by the alternative operation reception part.

2. The vehicle control system according to claim 1, wherein the alternative operation reception part includes a gesture recognition unit that recognizes a motion of the occupant as a gesture, and an operation by the motion of the occupant that is recognized by the gesture recognition unit is received.

3. The vehicle control system according to claim 2, wherein the automated driving control part changes a course of the vehicle based on a motion of a predetermined region of a body of the occupant that is recognized by the alternative operation reception part.

4. The vehicle control system according to claim 1, wherein the alternative operation reception part further includes a speech recognition unit that recognizes speech from the occupant, and an operation by a content of the speech that is recognized by the speech recognition unit is received.

5. The vehicle control system according to claim 4, wherein the alternative operation reception part receives the operation by the content of the speech when a sound volume of the speech that is acquired by the speech recognition unit is equal to or more than a threshold value.

6. The vehicle control system according to claim 1, wherein the alternative operation reception part further includes a switch unit, and during an operation is being applied on the switch unit or before a predetermined period of time elapses since an operation is applied on the switch unit, the operation which is different from the operation with respect to the driving operation element by the occupant is received.

7. The vehicle control system according to claim 1, wherein the alternative operation reception part further includes a tread detection sensor that detects a pressure with respect to a floor surface of the vehicle, and
the automated driving control part performs a control with respect to acceleration/deceleration of the vehicle when the driving operation element is disabled by the operation element state change part and when a pressure is detected by the tread detection sensor.

8. The vehicle control system according to claim 1, further comprising
a circumstance situation recognition unit that recognizes a circumstance situation of the vehicle and that performs a risk determination of a collision with respect to an object outside the vehicle,
wherein the automated driving control part makes a degree of the risk determination by the circumstance situation recognition unit when the driving operation element is disabled by the operation element state change part higher compared to a degree of a risk determination when the driving operation element is operable.

9. A vehicle control method, by way of an in-vehicle computer, comprising:
performing automated driving in which at least one of acceleration/deceleration and steering of a vehicle is automatically controlled;
making a driving operation element that receives, during performing manual driving, an operation of an occupant with respect to acceleration/deceleration and steering of the vehicle disabled when the automated driving is performed;
receiving an operation which is different from the operation with respect to the driving operation element by the occupant when the driving operation element is disabled; and
controlling at least one of acceleration/deceleration and steering of the vehicle based on the received operation which is different from the operation with respect to the driving operation element.

10. A non-transitory computer-readable recording medium including a vehicle control program that causes an in-vehicle computer to:
perform automated driving in which at least one of acceleration/deceleration and steering of a vehicle is automatically controlled;
make a driving operation element that receives, during performing manual driving, an operation of an occupant with respect to acceleration/deceleration and steering of the vehicle disabled when the automated driving is performed;
receive an operation which is different from the operation with respect to the driving operation element by the occupant when the driving operation element is disabled; and
control at least one of acceleration/deceleration and steering of the vehicle based on the received operation which is different from the operation with respect to the driving operation element.

11. The vehicle control system according to claim 1, wherein the operation element state change part stores the driving operation element and makes the driving operation element disabled.

* * * * *